UNITED STATES PATENT OFFICE.

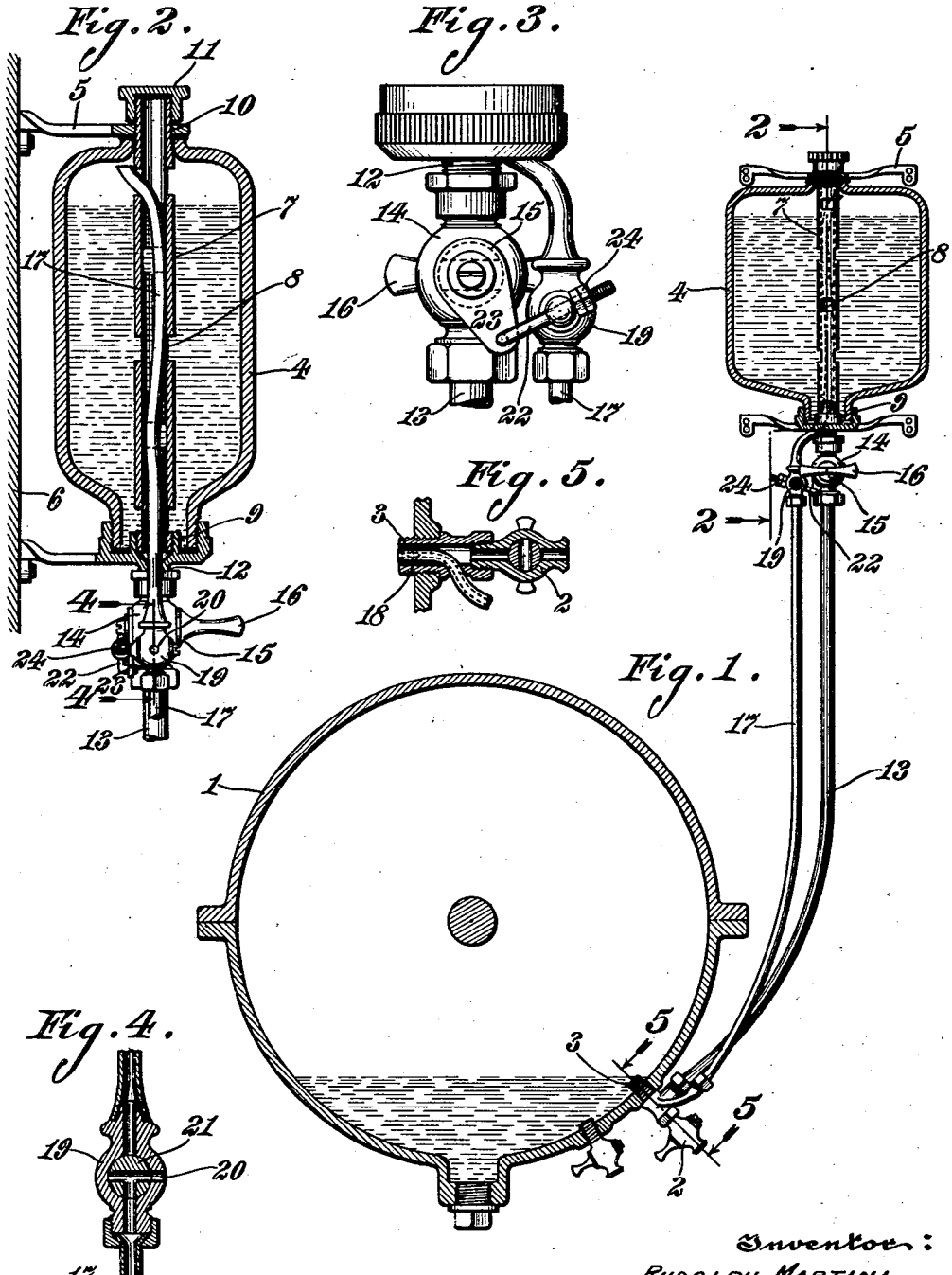

RUDOLPH MARTINI, OF ST. LOUIS, MISSOURI.

AUTOMOBILE-OILER.

1,171,223.

Specification of Letters Patent.   Patented Feb. 8, 1916.

Application filed May 3, 1915. Serial No. 25,469.

*To all whom it may concern:*

Be it known that I, RUDOLPH MARTINI, a citizen of the United States, and residing at St. Louis, in the State of Missouri, have invented a certain new and useful Improvement in Automobile-Oilers, of which the following is a specification.

This invention relates to devices for supplying lubricant to the crank cases of gas engines, and it is applicable especially for use in connection with the engines of motor vehicles, the device being of the type which contemplates feeding a supply of lubricant into the casing to be taken up by the crank shafts and distributed over the parts during the operation of the engine. Lubricating devices of this character, as heretofore devised, have been more or less defective and unsuccessful, due to the fact that in these prior devices there exists a grave liability of the casing receiving an oversupply of lubricant, or of the lubricant backing up in the feed duct and thus retarding or preventing a proper flow of lubricant through said duct from the source of supply to the casing, these defects being the result largely of the fact that the air pressure in the tank and casing is wholly uncontrolled, thus leading to an improper pressure of air in the lubricant supplying devices.

This invention has for its objects to overcome the above noted objections and defects by providing an efficient lubricating device which will readily and properly supply a determined amount of lubricant to the casing; one in which liability of the casing receiving an oversupply of lubricant is wholly precluded; one wherein the lubricant will, during the operation of supplying the casing, flow freely through the supply duct; and one in which the air supplying means is under complete control, thereby insuring a proper atmospheric pressure in the supply reservoir, and a balancing pressure between the reservoir and casing to insure a proper supplying of lubricant to the latter.

With these above objects in view, the invention comprises the novel features of construction and combination of parts more fully hereinafter described.

In the accompanying drawings: Figure 1 is a view, partly in section, of a lubricating device embodying this invention; Fig. 2 is a section, on a somewhat larger scale, taken vertically through the supply tank on the line 2—2, Fig. 1; Fig. 3 is an enlarged detail view, in elevation, showing the connection between the controlling valves; Fig. 4 is a detail section, on an enlarged scale, of the air controlling valve, the section being taken on the line 4—4, Fig. 2; and, Fig. 5 is a detail sectional view, on an enlarged scale, taken on the line 5—5, Fig. 1.

Referring to the drawings, 1 designates the engine crank casing provided with a pet cock 2 having its tubular stem 3 threaded through the casing at the point of the desired oil level, these parts, which are conventionally shown, being of the usual or any other appropriate construction.

Supported adjacent to the casing, and preferably in a plane above the latter, is a supply tank or reservoir 4 sustained by brackets 5 attached to the vehicle dash or other support 6, the tank being provided with a central longitudinally disposed tubular core 7 perforated at suitable intervals between its ends, as at 8. The core 7 is in threaded engagement, at its lower end, with a bearing 9, and, at its upper end, with a bearing 10, beyond which and the upper end of the casing the core projects to form a seat for a cap or closure 11, while the bearing 9 merges into a reduced coupling neck or nipple 12 projecting beyond the lower end of the casing.

Suitably coupled, at one end, to the pet cock 2, and having communication through the stem 3 thereof with the crank casing, is a lubricant supply tube or duct 13 having its other end coupled to a valve casing 14, which in turn is engaged with the coupling nipple 12, there being arranged in the casing 14 a suitable controlling valve 15 provided with the usual finger piece 16, by means of which the valve is manipulated for opening or closing the duct 13 through which lubricant is fed from the tank 4 to the casing 1.

Disposed adjacent to the oil duct 13 is an air duct 17 coupled, at one end, to the pet cock 2, through the tubular portion 3 of which the duct extends, as at 18, for direct communication with the interior of the casing 1. The duct 17 has its upper portion or section entered into the tank 4 and passed upwardly through the core 7 with its upper terminal projecting through one of the perforations 8 and at a point above the level of the lubricant in the tank, for a purpose more fully hereinafter explained.

Coupled into the duct 17, at a point between its ends and adjacent to the valve 15, is a valve casing 19 provided with a lateral port or vent 20 and containing a two-way valve 21 having the rear end of its stem connected by a coupling member or link 22 with the outer end of a crank arm or other eccentric 23 fixed upon the stem of the valve 15 for movement with the latter, the link 22 being threaded for the reception of an adjustable nut 24, as shown more clearly in Fig. 3. Through the connection 22, 23 the valve 21 is coupled to and for movement with the valve 15, and, by manipulation of the nut 24 on the threaded portion of the link, a relative adjustment of the valves may be effected.

In practice, when the valve 15 stands in closed position, as in Fig. 1, the valve 21 will stand in the position as illustrated in Fig. 4, with the upper section of the duct 17 closed, and the lower section of said duct in communication with the external atmosphere through the port or vent 20, it being understood, of course, that a supply of lubricant has been fed into the crank casing 1 from the tank 4, with the level of the lubricant in the casing above the inner end of the pet cock 2 and the adjacent end of the air duct 17. After the level of the lubricant in the casing has fallen below the normal point, that is, below the inner end of the cock 2, and it becomes necessary to replenish the supply, the finger piece 16 is manipulated for opening the valve 15 to permit the lubricant to flow from the tank 4 through the duct 13 to the casing. This manipulation of the valve 15 serves, through the connection 22, 23, to move the valve 21 to position for closing the port 20 and establishing communication through the duct 17 between the casing 1 and the tank 4, whereby air in the casing will pass through the duct and be delivered into the tank at a point above the level of the lubricant in the latter, thus causing atmospheric pressure to be established in the tank, resulting in the lubricant flowing freely through the duct 13 for supplying the casing. The flow continues until the oil level in the casing covers the air inlet 18, when, the air being cut off, the flow will stop. The valve 15 is now closed, and the valve 21 simultaneously moved to its normal position with the upper section of the duct 17 closed and the lower section in communication with the vent 20. When the valve is in this position air passes in through the vent 20 to the lower section of the duct and serves to prevent the lubricant in the casing backing up in said duct, it being apparent that, after the level of the lubricant has fallen below normal and prior to manipulating the valves, air can pass freely through the lower section of the duct into the casing 1, and will later be returned through said duct to the tank 4.

It is not my intention to feed the lubricant continuously to the casing, this course being objectionable for the reason that the splashing of the oil causes a variable level leading to the possibility of the casing receiving an oversupply of lubricant. The purpose, therefore, is to effect a feeding of the lubricant only at times when it becomes necessary to replenish the supply in the casing, say, for instance, in the morning, at which time the valve 15 is opened and the lubricant allowed to flow until the level thereof rises above and closes the end 18 of the duct 17, which will cut off the air supply to the reservoir and stop the flow of lubricant through the duct 13, this action being due to a partial vacuum being created in the reservoir by the dropping of the level of the oil therein after the air is thus cut off. Inasmuch as the distance between the reservoir and casing is ordinarily not over two feet, the level of the oil in the reservoir will, after the end 18 of duct 17 is closed, have to drop only slightly for the pressure above the oil therein plus the weight of the column of oil in the duct 13 to counterbalance the atmospheric pressure on the oil in the casing and stop the flow through the duct, whereupon the valve 15 is closed and remains closed until time for again replenishing the supply of lubricant in the casing.

It is obvious that various changes may be made in the details of construction without departing from the spirit of this invention. It is, therefore, to be understood that this invention is not to be limited to the specific construction shown and described.

Having thus described the invention, what is claimed is:

1. In a lubricating device and in combination with an engine crank casing, a supply reservoir, lubricant and air ducts directly connecting the reservoir and casing and terminating at the determined oil level in said casing, and a valve adapted to close one of said ducts relatively to said reservoir after a determined supply of lubricant has been delivered to the casing and while the engine is in operation.

2. In a lubricating device and in combination with a casing, a supply reservoir, a lubricant duct connecting the reservoir and casing, an air duct also connecting said parts, and means for closing said ducts at will relatively to the reservoir.

3. In a lubricating device and in combination with a casing, a supply reservoir, lubricant and air ducts connecting the reservoir and casing, and a valve for opening and closing said air duct relatively to said reservoir.

4. In a lubricating device and in combination with a casing, a supply reservoir, a lubricant duct, an air duct, said ducts leading from the reservoir and communicating with the casing at the determined oil level, and means for closing said ducts at will relatively to the reservoir.

5. In a lubricating device and in combination with a casing, a supply reservoir, a lubricant duct, an air duct, said ducts connecting the reservoir and casing and communicating with the latter at the determined oil level, and means for simultaneously closing said ducts at will relatively to the reservoir.

6. In a lubricating device and in combination with a casing, a supply reservoir, lubricant and air ducts connecting the reservoir and the casing, and means for closing said air duct to the reservoir and for opening said air duct to the atmosphere.

7. In a lubricating device and in combination with a casing, a supply reservoir, a lubricant duct, an air duct, said ducts connecting the reservoir and casing, controlling valves in said ducts, and means connecting the valves for simultaneous movement.

8. In a lubricating device and in combination with a casing, a supply reservoir, a lubricant duct connecting said parts, a valve for closing said duct, an air duct connecting the reservoir and casing and having a valve casing provided with an external air port, and a valve in said casing and operable for closing communication between the reservoir and casing and opening communication between the latter and port.

9. In a lubricating device, and in combination with a casing, a supply reservoir, a lubricant duct, an air duct, said ducts being connected with the reservoir and communicating with the casing at a common point and at the determined oil level, controlling valves for said ducts, and means connecting the valves for simultaneous movement.

10. In a lubricating device, and in combination with a casing, a supply reservoir, a lubricant duct and an air duct connecting the reservoir and casing, controlling valves for said ducts, a crank arm movable with one of said valves, and a link connecting the crank arm with the other of said valves.

11. In a lubricating device and in combination with a casing, a supply reservoir, a lubricant duct and an air duct connecting the reservoir and casing, controlling valves for said ducts, a crank arm movable with one of the valves, a link connecting the crank arm with the other valve, and adjusting means on the link operable for setting the valves relatively.

12. In a lubricating device and in combination with a casing, a supply reservoir, a lubricant duct, an air duct, said ducts connecting the reservoir and casing, controlling valves for said ducts, and an adjustable connection between the valves for moving them simultaneously and setting them relatively.

13. In a lubricating device and in combination with a casing, a supply reservoir, a lubricant duct, an air duct, said ducts connecting the reservoir and casing and the air duct having an air port adapted to communicate with the casing through said duct, a valve for closing the lubricant duct, and a valve for normally closing the air duct between the reservoir and casing and opening the port.

14. In a lubricating device and in combination with a casing, a supply reservoir, a lubricant duct, an air duct having an external air port adapted to communicate with the casing through the duct, said ducts connected with the reservoir and communicating with the casing at the determined oil level, a valve for closing the lubricant duct, a valve for normally closing the air duct and opening said port, and means connecting the valves for simultaneous movement.

15. In a lubricating device and in combination with a casing, a supply reservoir, lubricant and air ducts connecting the reservoir and the casing, and valve mechanism adapted in one position to open the casing to the reservoir and in another position to close the reservoir and open the duct part leading to the casing to the atmosphere.

16. In a lubricating device and in combination with a casing, a supply reservoir, lubricant and air ducts connecting the reservoir and the casing, and valve mechanism in said ducts adapted in one position to open the reservoir to the casing and in another position to close the reservoir to said casing and open the air duct part leading to the casing to the atmosphere.

17. In a lubricating device and in combination with a casing, a supply reservoir, lubricant and air ducts connecting the reservoir and the casing, and a valve in said air duct adapted in one position to open the casing to the reservoir and in another position to close the air duct part leading to the reservoir and open the air duct part leading to the casing to the atmosphere.

18. In a lubricating device and in combination with a casing, a supply reservoir, lubricant supplying means including a duct connecting the reservoir with the casing, and means for closing said duct with respect to the reservoir and for opening said duct to the atmosphere.

19. In a lubricating device and in combination with a casing, a supply reservoir, lubricant supplying means including a duct connecting the reservoir with the casing, and a valve in said duct adapted in one position to open said duct between the casing and the reservoir and in another position to close said duct with respect to the reservoir and open said duct for establishing communication between the casing and the atmosphere.

In testimony whereof I affix my signature.

RUDOLPH MARTINI.